Oct. 9, 1962  C. W. FOLLEY  3,057,174
UNIVERSAL DRIVING JOINT
Filed July 28, 1961
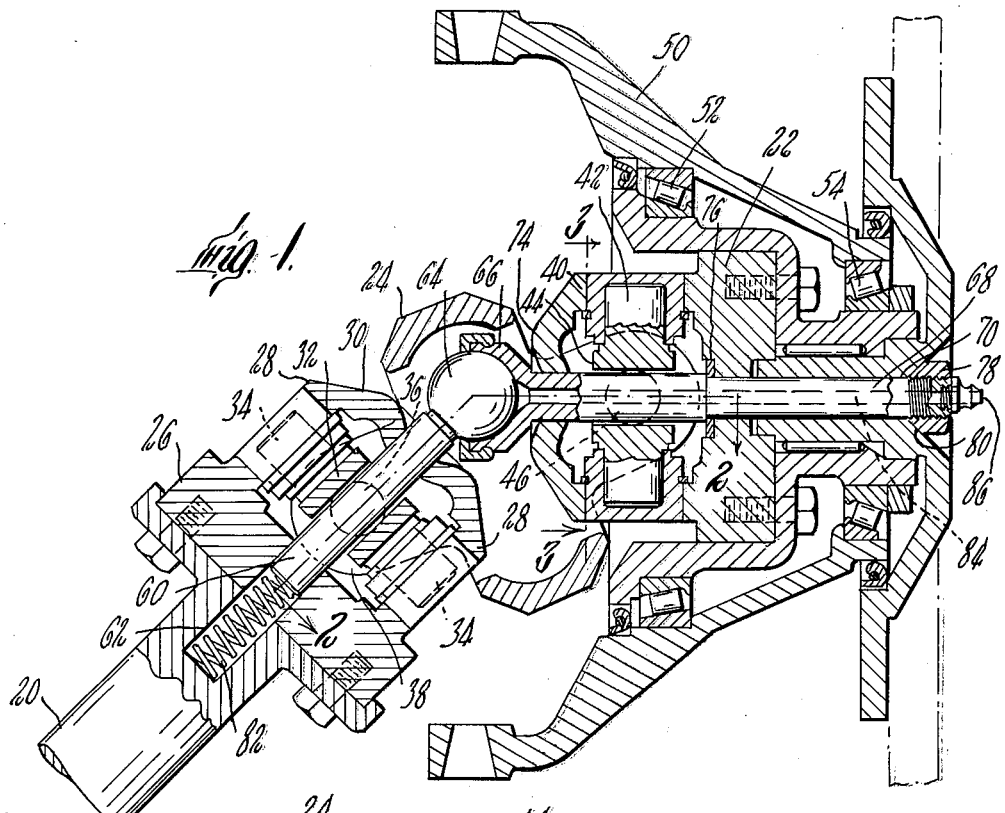
Fig. 1.
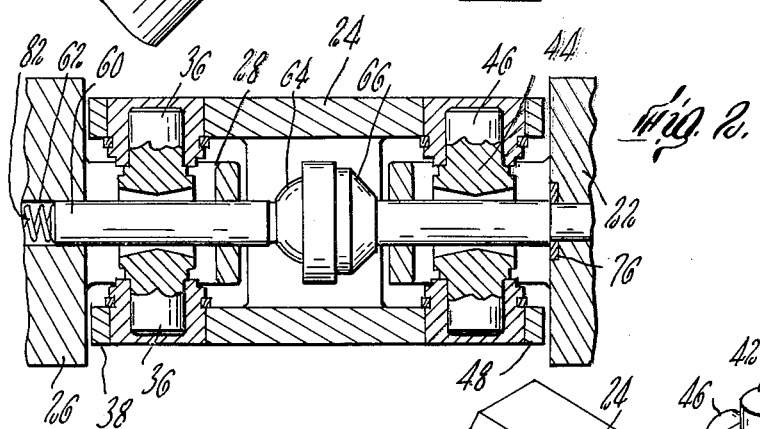
Fig. 2.
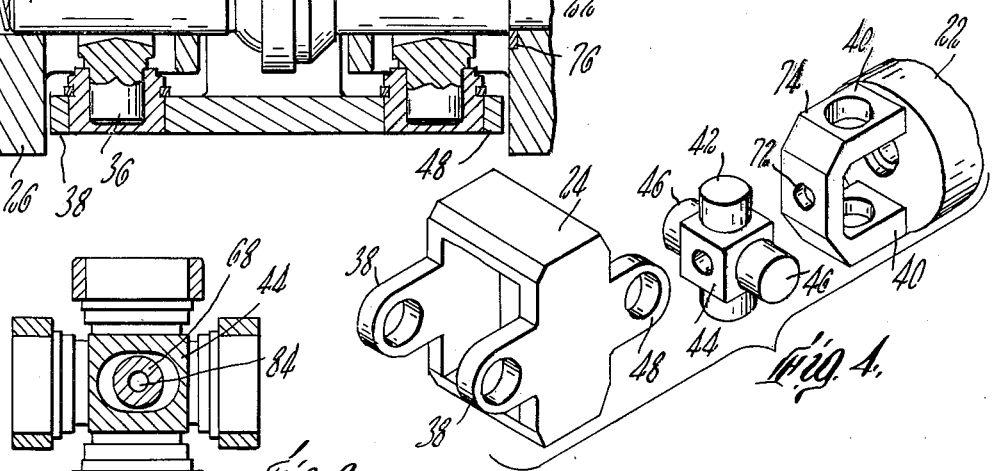
Fig. 3.
Fig. 4.

United States Patent Office 3,057,174
Patented Oct. 9, 1962

3,057,174
UNIVERSAL DRIVING JOINT
Cranston W. Folley, Kennebunk, Maine, assignor to Saco-Lowell Shops, Boston, Mass., a corporation of Maine
Filed July 28, 1961, Ser. No. 127,740
2 Claims. (Cl. 64—17)

The present invention relates to improvements in a universal driving joint.

The invention is shown in a preferred form as embodied in a front wheel drive for an automobile in which a sturdy dependable driving connection is required which will function in a normal unchanged manner under all conditions which may be encountered.

It is a principal object of the invention to provide a novel and improved universal driving joint in which there is provided a more efficient distribution of the driving stresses, and greater strength to withstand maximum strains which may be imposed especially when the axes of the driving and driven elements of the joint are placed at a substantial angle to one another.

It is a further object of the invention to provide an improved universal driving joint of the general character described having locating shafts extending along the axes of the driving and driven elements of the joint respectively and a ball and socket joint connecting said locating shafts in which a novel and improved device is employed for the adequate and convenient lubrication of said ball and socket joint.

With these and other objects in view as may hereinafter appear, the several features of the invention will be readily understood by one skilled in the art from the following description taken in connection with the accompanying drawings in which—

FIG. 1 is a sectional plan view of a constant velocity universal joint as applied to one of the driving wheels of a motor vehicle;

FIG. 2 is a sectional elevation taken on a line 2—2 of FIG. 1 illustrating particularly the relation of the universal drive connection including the connecting member spiders associated therewith, and the locating mechanism including locating shafts and the ball and socket joint connecting said shafts;

FIG. 3 is a detail sectional view taken on a line 3—3 of FIG. 1 to illustrate particularly the universal joint connecting the connecting member and driven member; and FIG. 4 is an exploded view in perspective showing particularly the spider connecting the connecting member and the driven member.

The invention is herein disclosed as a Double Carden type universal joint having centrally disposed locating shafts connected by a ball and socket joint. In the illustrated form of the invention the drive is taken to driving and driven elements through a connecting member and through spiders connecting said connecting member respectively with the driving and driven elements. The parts of said universal joint are maintained in the proper aligned position by means of two locating shafts which are supported respectively in alignment with the driving and driven elements of said universal connection and are connected by means of a ball and socket joint.

Referring to the drawings the drive is taken from a drive shaft 20 to a driven member 22 which may, for example, be identified as the drive wheel of a motor vehicle through a jointed connection in the form of a connecting member 24 which is connected by spiders respectively with the drive shaft 20 and with the driven member 22. As best shown in FIG. 1, the drive shaft 20 has bolted to the end thereof a yoke 26 having ears 28 which terminate at their outer ends in a transverse bearing support 30, hereinafter more specifically described.

The ears 28 are connected with a universal bearing block 32 forming part of a spider having trunnions 34 which engage in bearings formed in the ears 28, and transversely extending trunnions 36 which are journaled in bearings formed in two ears 38 of the connecting member 24. A spider of substantially identical construction is provided between the connecting member 24 and the driven element 22. As shown in FIGS. 1 and 4 the driven element 22 is provided with two ears 40 which are adapted to receive trunnions 42 comprising part of a spider including also a universal bearing block 44. Two transversely extending trunnions 46 formed in said block are pivotally mounted in bearings provided in two ears 48 projecting from the right hand end of the connecting member 24. As best shown in FIG. 1 of the drawings the driven member 22 is made up of several assembled parts which are secured together as a unit and which are rotatable in a stationary frame 50 on two sets of roller bearings indicated at 52 and 54.

The mechanism provided for locating the several component parts of the universal connection so that the driving angles between the connecting member and the driving and driven elements of the assembly through the two spiders will at all times be held equal comprises a locating shaft 60 mounted in an axial bore 62 formed in the drive shaft 20 extending through the yoke 26, said shaft 60 being further supported toward its outer end in the transverse bearing support 30 which forms an extension of the ears 28 of the yoke 26. The end of the shaft 60 is formed with a ball element 64 of a ball and socket joint, and is arranged to be engaged by a socket element 66 formed in the end of a second locating shaft 68. Said latter locating shaft 68 is fixed to the driven member 22 in coaxial relation thereto. The locating shaft 68 is supported toward its outer end within an axial bore 70 forming part of the wheel assembly, and at its inner end in an axial bore 72 (see FIG. 4) formed in the transverse bearing support 74 extending across the outer ends of the ears 40 of driven member 22. The locating shaft 68 is fixed against movement in said bores by the engagement of a shouldered portion thereof against an end thrust washer surface 76, and in the opposite direction by means of a nut 78 threaded to the outer end of the shaft for engagement against a tapered bearing surface 80 formed in the outer face of the wheel assembly 22. With this construction it will be evident that the position of the ball and socket joint is fixed in space with relation to the axis of the driven element 22. The locating shaft 60 which extends along the line of the axis of the driving shaft 20 is spring pressed to maintain a tight operating fit of the ball and socket elements by means of a compression spring 82 which is contained within the bore 62 and is seated at its outer end against the butt end of the locating shaft 60.

In the preferred construction shown, provision is made for lubricating the ball and socket joint 64, 66, which comprises a small axial bore 84 which extends along the length of locating shaft 68 and is capped at its outer end with an oil cup 86. This construction has the advantage that an easily accessible device is provided for maintaining an adequate lubrication of this very important ball and socket joint.

The construction shown has the further great advantage that a very substantial added support is provided for the locating shafts and associated ball and socket joint against bending strains and against the side load which becomes progressively greater as the angle between the axes of the drive shaft and driven member becomes more acute. An outstanding feature of applicant's construction in this connection comprises the two bearing supports 30 and 74 associated with the drive shaft and driven member respectively which provide a very strong lateral support for each of the locating shafts 60 and 68 at a point most closely adjacent the ball and socket joint 64, 66.

The invention having been described what is claimed is:

1. A universal driving joint comprising a driving element rotatable on a drive axis, a driven element rotatable on a driven axis intersecting with said drive axis, a connecting member providing a driving connection between said driving and driven elements, a spider connecting said driving element with said connecting member, a second spider spaced from said first mentioned spider connecting said connecting member with said driven element, whereby a driving impulse is transmitted from said driving element to said driven element through said connecting member, a locating shaft providing one of the elements of a ball and socket joint at the intersection of said axes fixed coaxially with relation to said driven element, bearings on said driven element engaging said locating shaft at both sides of the spider which connects said driven element with the connecting member, a second locating shaft providing the other element of said ball and socket joint at the intersection of said axes adjustable axially with relation to said driving element, and bearings on said driving element engaging said latter shaft at both sides of the spider which connects said driving element with the connecting member.

2. A universal driving joint comprising a driving element rotatable on a drive axis including a yoke on said driving element formed to provide universal bearing supporting ears and a transverse bearing support beyond said ears, a driven element rotatable on a driven axis, including a second yoke on said driven element formed to provide universal bearing supporting ears and a transverse bearing support beyond said ears, a connecting member providing a driving connection between said driving element and said driven element having universal bearing supporting ears at each end thereof, universal bearing blocks having trunnions journaled respectively in the ears of said connecting member and of said yokes, a locating shaft providing one of the elements of a ball and socket joint fixed axially with relation to said driven element, bores for said locating shaft in said driven element yoke bearing support and within said driven element, and a second locating shaft providing the other element of said ball and socket joint including means for adjustment axially of said other element with relation to said driving element, and bores for said latter locating shaft in said yoke bearing support and within said driving element.

References Cited in the file of this patent

UNITED STATES PATENTS

| | | |
|---|---|---|
| 1,979,768 | Pearce | Nov. 6, 1934 |
| 2,042,513 | Daniell | June 2, 1936 |
| 2,067,286 | Pearce | Jan. 12, 1937 |
| 2,947,158 | King | Aug. 2, 1960 |